United States Patent

Brault et al.

[11] Patent Number: 5,249,968
[45] Date of Patent: Oct. 5, 1993

[54] CPR MANIKIN (PISTON)

[75] Inventors: Richard Brault; Dianne Croteau, both of Toronto, Canada

[73] Assignee: Actar, Inc., Toronto, Canada

[21] Appl. No.: 795,389

[22] Filed: Nov. 21, 1991

[30] Foreign Application Priority Data

Apr. 17, 1991 [CA] Canada .................. 2040710

[51] Int. Cl.$^5$ .................................. G09B 23/28
[52] U.S. Cl. .................................. 434/265; 92/43; 92/44; 267/122
[58] Field of Search ............ 434/265; 92/44, 43, 92/34; 267/122

[56] References Cited

U.S. PATENT DOCUMENTS

| | | | |
|---|---|---|---|
| 2,947,470 | 8/1960 | Ruben et al. ............... | 92/43 X |
| 2,966,929 | 1/1961 | Brown ........................ | 92/43 |
| 3,369,411 | 2/1968 | Hines ......................... | 92/34 |
| 4,006,329 | 2/1977 | Hellman et al. ........... | 92/43 X |
| 4,084,811 | 4/1978 | Kyo ............................ | 92/34 X |
| 4,345,605 | 8/1982 | Gereg ........................ | 92/43 X |
| 4,852,675 | 8/1989 | Wang ......................... | 92/34 X |
| 4,984,987 | 1/1991 | Brault et al. .............. | 434/265 |

*Primary Examiner*—Gene Mancene
*Assistant Examiner*—L. Thomas
*Attorney, Agent, or Firm*—R. Gale Rhodes, Jr.

[57] ABSTRACT

A compressible piston (40) is disclosed for use in a CPR manikin to simulate the resistance of the human chest cavity. The piston (40) has a flexible corrugated upper wall (42) to permit compression and a lower rigid wall portion (43) to act as a tactile indicator of the limit of acceptable compression.

5 Claims, 4 Drawing Sheets

CPR MANIKIN (PISTON)

TECHNICAL FIELD

This invention relates to a manikin intended to be used as a tool for teaching cardio-pulmonary resuscitation (CPR) techniques including ventilation and/or external heart massage. In particular it relates to a piston adapted to simulate the resistance of one's chest to external heart massage.

BACKGROUND ART

CPR instruction involves teaching both the theory of artificial resuscitation and external heart massage and practical techniques for application of the theory. Students can practise artificial breathing techniques on one another, but, often there is a reluctance to do this in a classroom environment because of the intimate nature of the mouth to mouth ventilation method and because of concerns about the transmission of disease. On the other hand, the techniques of external cardiac massage are too aggressive to be practised fully on other students. Consequently, there has been a demand for the manufacture of manikins which will enable students to practise both the ventilation and external heart massage techniques of CPR.

There are many complex and interrelated functions and structures of the human body that are pertinent to the application of both ventilation and cardiac massage resuscitation techniques. Some of the features that are sought to be obtained in a CPR manikin are; a hygienic system which will prevent the transmission of disease from one student to another, a moveable head to permit positioning for throat clearance, a realistic anatomy showing body features which serve as indicators or "landmarks" to locate points of administration, a moveable chest which visually demonstrates breathing during ventilation, a means for measuring and changing volume of air to simulate adults and children, a compressible chest cavity which provides realistic resistance.

Many different systems have been developed for manikins to reduce transmission of germs and viruses. Some manikins are adapted to be cleaned with cleaning solutions after each student uses the manikin. In other manikins, a removable face piece or mask is provided to fit onto the head to be exchanged for a clean one as each student takes a turn. Some manikins have disposable lower airways or lungs to be replaced in the manikin after each student.

The other structural and functional features desired in a manikin are obtained in varying degrees by different manufacturers. Some take pains to replicate the human features even to the extent of attempting to duplicate the texture and feel of human skin. Various types of internal plumbing are used to simulate the airways of the body and sometimes electronics are incorporated into the manikin to produce electrical signals or computer displays relevant to the administration of the techniques. Some manufacturers have patented some manikins or devices for practising ventilation techniques. The applicant is aware of U.S. Pat. Nos. 2,904,898 and 3,068,590, French patent 1,207,372 and Australian Patent 270,640. However, these devices do not provide a means for practising the full CPR techniques. Others have developed manikins to provide both ventilation and external massage, but, it seems to the applicants that the trend in the manufacture of CPR manikins has been towards technical sophistication which in turn has led to the development of expensive manikins. The basic CPR manikins that are known to the applicants cost hundreds of dollars, others cost more than a thousand dollars.

No doubt the sophistication of the CPR manikin technology is useful to instruction of some students, perhaps in cases where advanced courses are being taken. It is the perception of the applicants, however, that there is a public interest in providing basic CPR training to many people since it is usually applied in an emergency situation where it may not be practical to wait until a CPR expert arrives at the scene. It is believed that simple techniques can be effective and that the more people that know the techniques the more likely that there will be someone available to assist an emergency victim. Regular and frequent practise is seen by the applicants to be an important feature of any CPR instruction program and to retention of the skills learned. Applicants believe therefore that it may be disadvantageous to have only expensive manikins available for teaching programs aimed at providing basic skills to many people. It will be appreciated that most instructors would not be able to afford more than 1 or 2 of these expensive manikins for each class. Therefore students must take turns on the manikin. There is less opportunity to practise and teaching is time inefficient where students are waiting to practise. While there may be some benefit in watching others practise it is the applicants' view that it would be more beneficial to instruction and more efficient to have all students practise together as a class on separate manikins. Moreover, if manikins were inexpensive students might obtain a manikin for practise at home to retain their skills after completion of the course.

It is also believed that there is a need for a readily portable manikin to enable an instructor to travel from one location to another to provide instruction. Many prior art manikins are believed to be too large and cumbersome for a single instructor to transport conveniently in large numbers. Applicants believe that an instructor should be able to carry many manikins in a hand held or over the shoulder carrying case.

In U.S. Pat. No. 4,984,987 the applicants disclosed an inexpensive, readily portable manikin to serve as a teaching tool for a basic CPR instruction course. The manikin comprised in combination a head means, a chest means, a disposable lung means, and a compression means in which;

the head means has an opening to receive air blown into it by a user, the chest means is adapted to be removably connected to the head means, the disposable lung means is adapted to be removably connected to the head means within the chest means, in communication with the opening of the head means, the compression means is adapted to fit within the chest means to receive compression administered by a user.

The head means of this manikin was said to be a hollow head which will avail itself to mass production techniques. The head has a mouth and nostril openings for artificial resuscitation. The head has a neck portion which is adapted to be connected to a disposable lung bag to receive the air blown into the head. The neck was also adapted to connect into a opening in the chest means. The chest means was a simple shell to provide a visual impression of a torso with anatomical indicators or reference points to assist one to locate the correct position for hand placement during application of the compression heart massage techniques. The front and back portions of the chest were said to be separated by a resilient compression means.

The compression means was described as being adapted to be fitted within the chest means at a predetermined location where external massage would be given. It is compressed by a user attempting to practise external heart massage and resiliently restores itself as the compression is removed. U.S. Pat. No. 4,984,987 taught that the compression means could be manufactured in many ways with different materials including a compressible foam, a hydraulic or pneumatic piston, a spring and an "accordion" folded flexible member. The preferred form was said to be a cylinder which is sufficiently resilient to provide resistance to deformation under a force of compression and substantially to return to its undeformed state when the force of compression is removed. The resistance should resemble the kind of resistance a human body would provide.

The present invention is a particular compression piston construction which has been developed specifically for use in a C.P.R. manikin to simulate the resistance of a chest cavity. The piston construction permits one to manufacture pistons to simulate the chest resistance and dimensions of an adult or a child. Moreover, the piston is simple, cost effective and durable.

DESCRIPTION OF THE INVENTION

The piston of the present invention is a tube of a length from a top end to a bottom end approximating the depth of a chest cavity comprising;

a upper wall portion having corrugated folds made of a material sufficiently elastic to permit the corrugated folds to be folded completely and repeatedly and to exert a restorative force approximating the resistance of a human chest to compression so that the top end of the tube, under a force of compression, may be moved from a first position towards the bottom end of the tube to a second position and so that upon removal of the force of compression the corrugated folds will elastically flex back to restore the top end to the first position, and a lower wall portion having walls sufficiently rigid to resist longitudinal flexing under a force of compression of the order of magnitude used in C.P.R. heart massage techniques, said lower wall having at least one opening to permit air to escape from and return to the interior of the tube during compression and restoration of the upper wall portion.

It is important that students correctly place their hands to apply cardiac massage. The cylindrical shape of the piston and the nature of its construction permit it to tilt over if pressure is applied in the wrong place. An instructor can readily detect incorrect hand placement during practice sessions by observing whether the piston is compressing vertically or at an angle. Then a correction to the student's technique can be administered.

In cardiac heart massage techniques it is usually recommended that the compression of the chest of an adult should not exceed 2" and for children that the compression not exceed 1.5". Accordingly in the present invention the corrugated folds are designed so that the maximum distance that the top end can move towards the bottom end is 2" for an adult piston and 1.5" for a child piston. These distances are determined by the number of folds of the corrugated wall and the longitudinal distance of movement required to collapse each fold completely upon itself. When the corrugations are completely folded the lower wall acts as a stop against further compression. This stop serves as a tactile indicator to a student that the compression is too aggressive.

It will be appreciated that many elastic materials will be suited to provide resistance and elasticity necessary for the construction of this invention. It has been found through experimentation that certain materials are better suited than others to this device. It has been determined that advantages important to the intended use of this invention are obtained if certain materials are used in its construction. Durability features are desirable because the piston should have a reasonably long life under conditions of vigourous use and not always careful handling by inexperienced students around pools and on hard surfaces. Resistance to wear, to breakage, tearing and permanent bending and resistance to chlorinated water damage re important. The piston should also be lightweight and readily transportable. The material should be safe to handle and avoid presentation of sharp or abrasive edges or surfaces. The material should also be capable of being used for both the top and bottom walls of the piston to simplify manufacture, therefore it must be flexible and strong enough to permit corrugations that will provide a sufficient resistance to compression and yet be rigid enough in a straight wall to act as a stop. It should also be adaptable to mass manufacturing techniques.

BRIEF DESCRIPTION OF THE DRAWINGS

In the figures that illustrate the preferred embodiment of this invention.

MODES FOR CARRYING OUT INVENTION

In the figures that illustrate the preferred embodiment of this invention like numerals indicate like elements.

Figure 1:
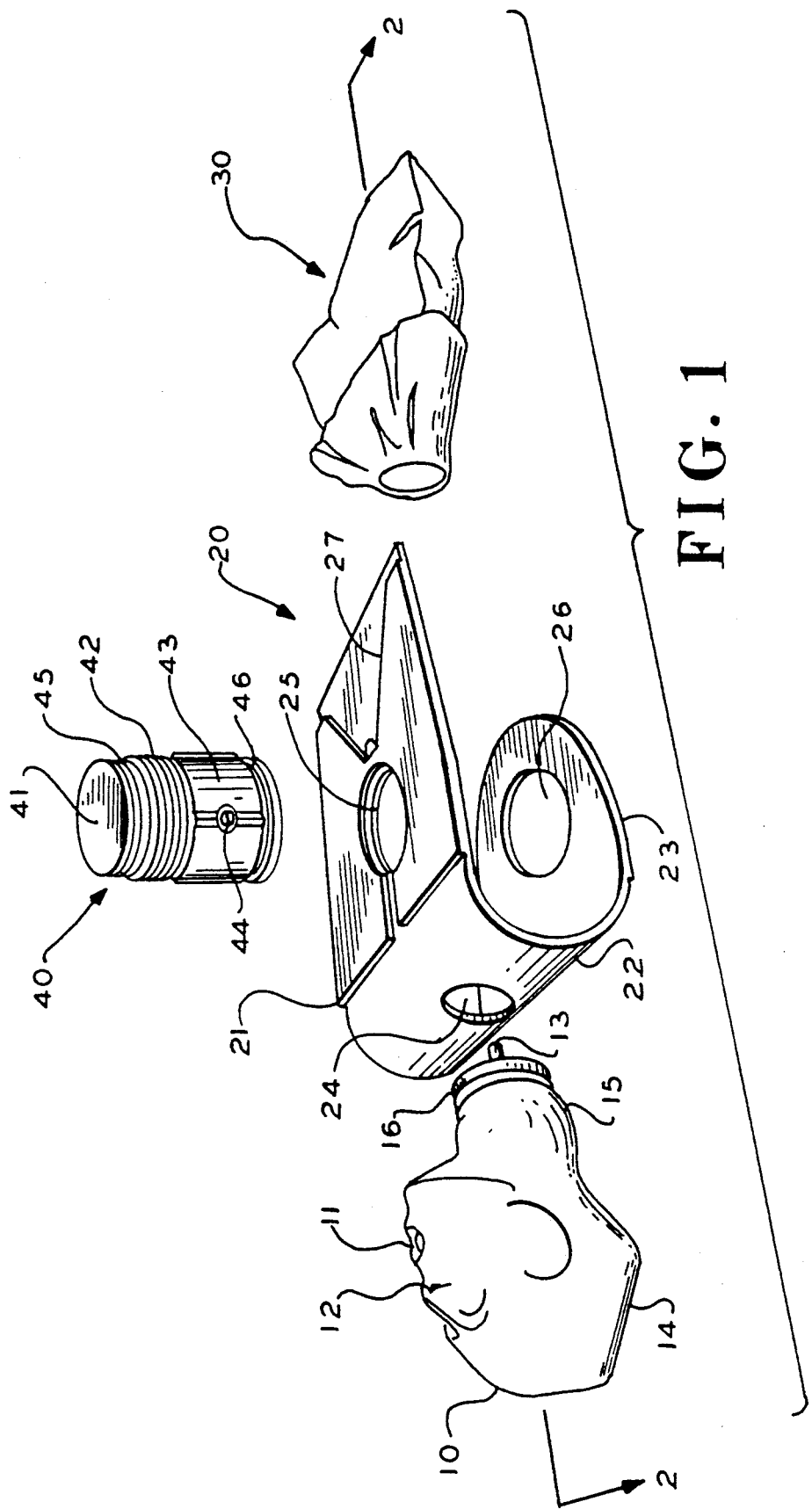
FIG. 1 is an exploded view of the components of a manikin in which a piston of this invention is used.

The arrangement of the components of a manikin in which the piston of this invention may be used is illustrated in FIG. 1. A head means (10) is a blow moulded hollow plastic shell which has general approximations of the shape and features of a human head. Openings are provided for the mouth (11), the nostrils (12) and the throat (13). The back portion of the head has a seat (14) which is flattened so that it will lie flat against the floor when the head is tilted back to provide an indicator for the procedure used for opening the victim's throat. The head has a neck (15) in which there is a fitting groove (16).

A chest plate (20) is an integral cross-linked polyethylene closed cell foam sheet die cut in the general shape of a chest (21), shoulders (22) and a back (23). The chest cavity is formed by bending the chest plate (20) over upon itself so that the back plate (23) lies against the floor and the front plate (21) overlies it. A neck opening (24) is cut centrally in the shoulder portion (22). A front opening (25) and a rear opening (26) are provided to fit about a compression piston (40). The compression piston (40) secures and separates the chest (21) and the back (23).

The disposable lung means is a plastic bag (30). An elastic band (32) [not shown in FIG. 1—see FIG. 2] is looped about the bag (30) at a location appropriate to the volume of the lung capacity of the imaginary victim. The bag (30) is marked with dotted lines (not shown) or the like for location of the elastic band (32) to simulate the lung volumes of different types of possible victims.

The preferred embodiment of piston (40) is a hollow, cylindrical, blow-moulded thermoplastic elastomer having an internal diameter slightly larger than the outside diameter of the neck (15). It has a closed top (41) adapted to receive a hand administered compressive force. The upper portion of the side wall is corrugated to form an bellows (42) which will compress and reform resiliently under the influence of compressive forces applied to plate (41). The lower portion (43) of the side wall comprises a stop not deformable under ordinary compressive loads expected to be administered during practice sessions. The stop presents a tactile indicator to the student that compression has reached an acceptable limit. Exhaust ports (44) are provided to allow air to escape from the compressive means (40) or to re-enter during deformation and reformation. A top fitting groove (45) and a lower fitting groove (46) are provided to fasten the piston (40) within the chest plate (20) to the front plate (21) and the back plate (23) respectively. The bottom (48) of the piston (40) is open.

Figure 5:
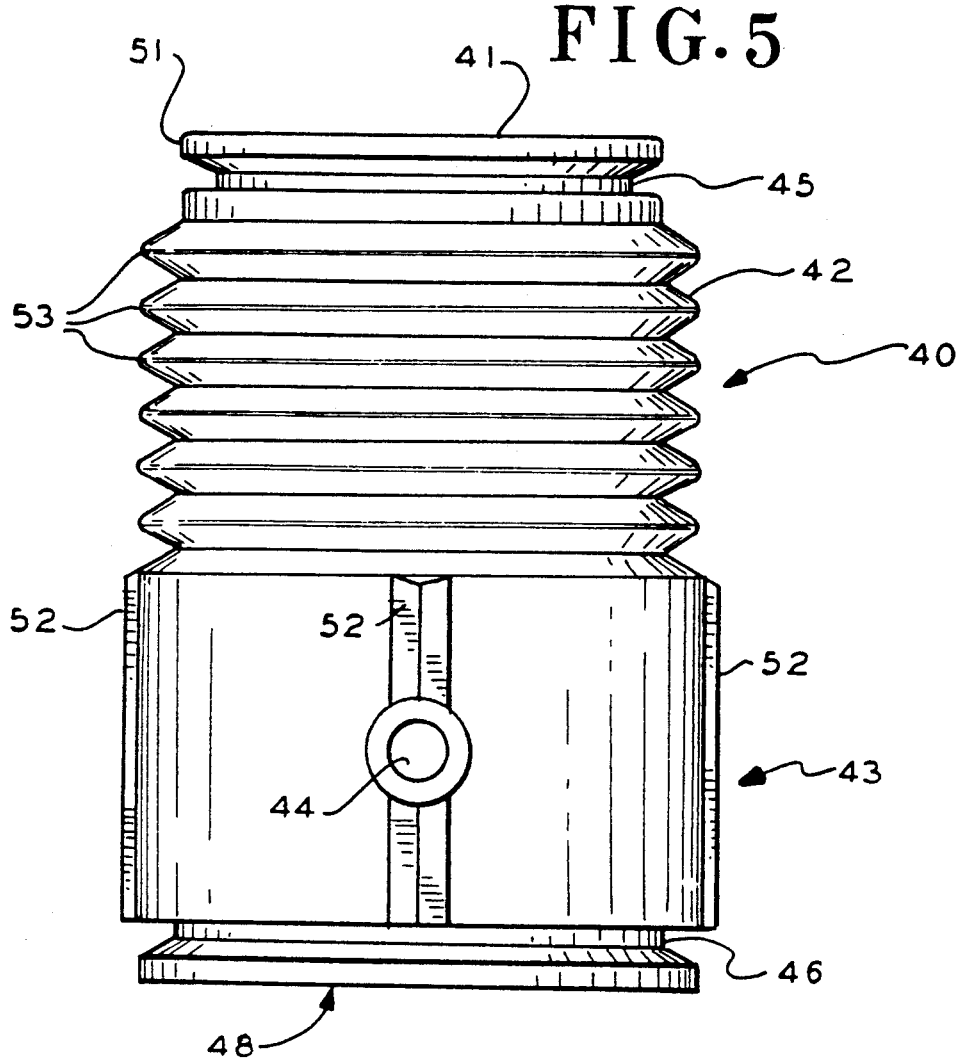
FIG. 5 is a side view of a preferred embodiment of a piston of this invention.
Figure 6:
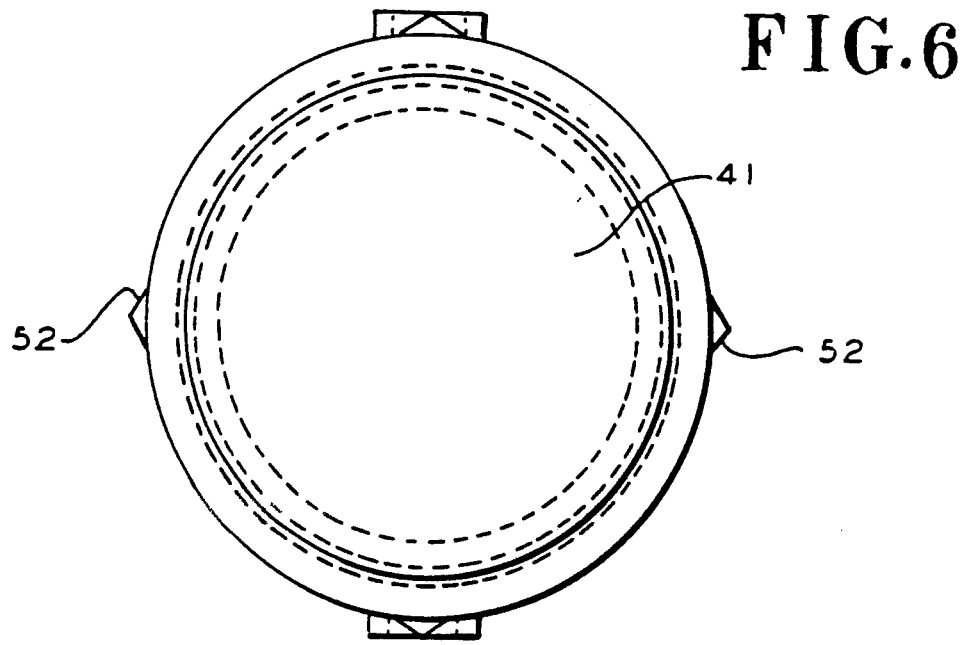
FIG. 6 is a top view of the preferred embodiment of the piston of this invention.

Further details of the piston are shown in FIGS. 5 and 6. In FIG. 5, the distance between the top end 41 and the bottom 48 is 7 inches. The piston is blow molded from a parison having a constant wall thickness. The blow molding will of course alter the wall thickness at points where the wall changes direction but generally the wall thickness of the piston is constant from top to bottom. The radius of the top lip 51 is 2 inches. The top fitting groove 45 has an outside diameter of 1.72 inches. The bottom 48 has an outside radius of 2.28 inches, whereas the bottom fitting groove 46 has an outside radius of 2 inches. The outside radius of the lower wall portion and the most outside portion of the upper wall bellows is 2.28 inches. Four triangular reinforcing ribs 52 are equidistantly disposed about the circumference of the lower wall portion 43. Centrally disposed in two of the opposing ribs 52 is a ventilation hole 44. Each of the corrugations 53 in the top bellow portions 42 of the piston have outside walls angled at approximately 30° to the horizontal. The distance between the outside tips of each adjacent corrugation 53 is 0.218 inches. There are six corrugated folds as shown in FIG. 5. The distance from the beginning of the top corrugation to the top of the reinforcing ribs is 2.875 inches.

A child's manikin may be made using a parison of the same radius but using a mold that is ¾ inch less in length and ½ inch less in length in the bellows area.

Figure 2:
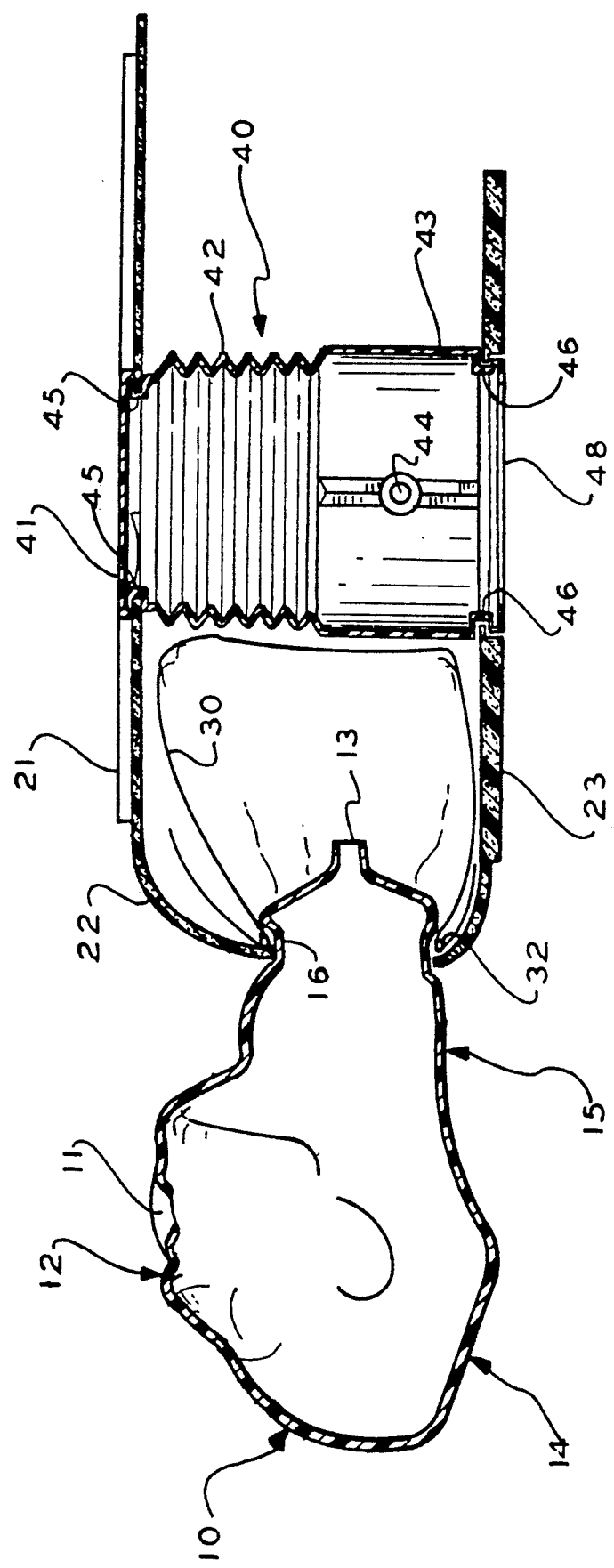
FIG. 2 is a side sectional view illustrating an assembled manikin having a piston of this invention.

The assembled manikin is shown in FIG. 2. The elastic band (32) is fitted at an appropriate location over bag (30) and to top of the bag (30) is flapped over the elastic band (32) as shown in FIG. 1. Next, the fitting groove (16) in the neck (15) receives the shoulder opening (24) of the chest plate (20) and then the preassembled bag (30) and elastic band (32) of the disposable lung means (30) in an elastic press fit connection. The piston (40) is fitted to front plate (21) and the back plate (23) in fitting grooves (45) and (46) respectively. The manikin in now ready for use.

Figure 4:
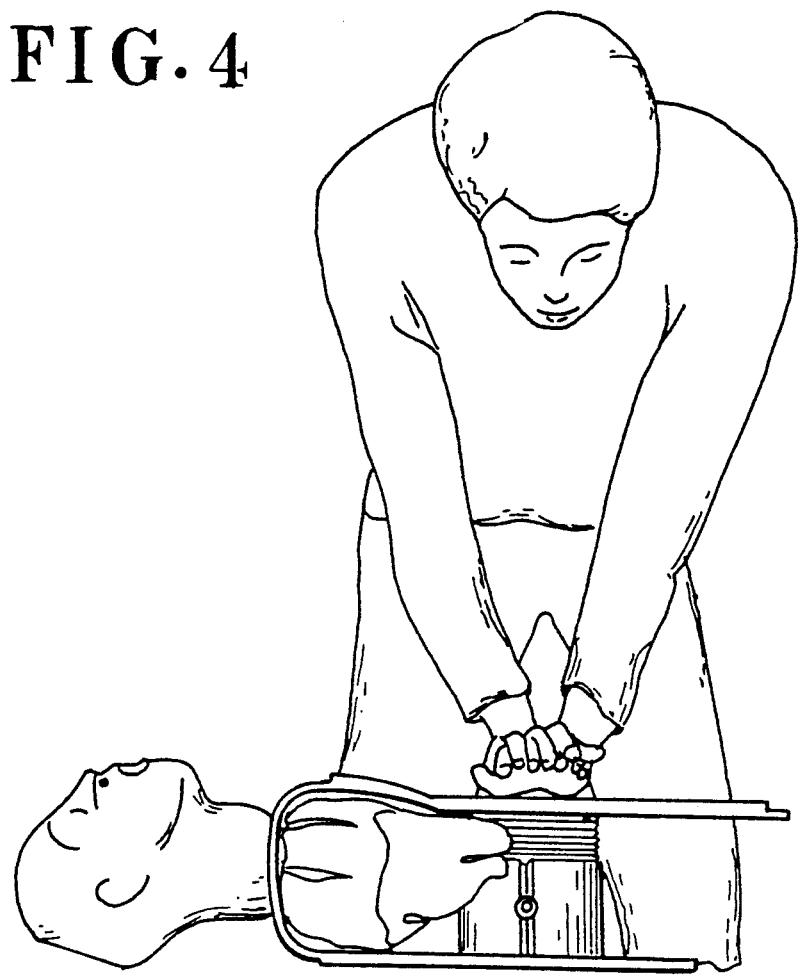
FIG. 4 is a side view of the manikin as it is being used for practise of external heart massage techniques.
Figure 3:
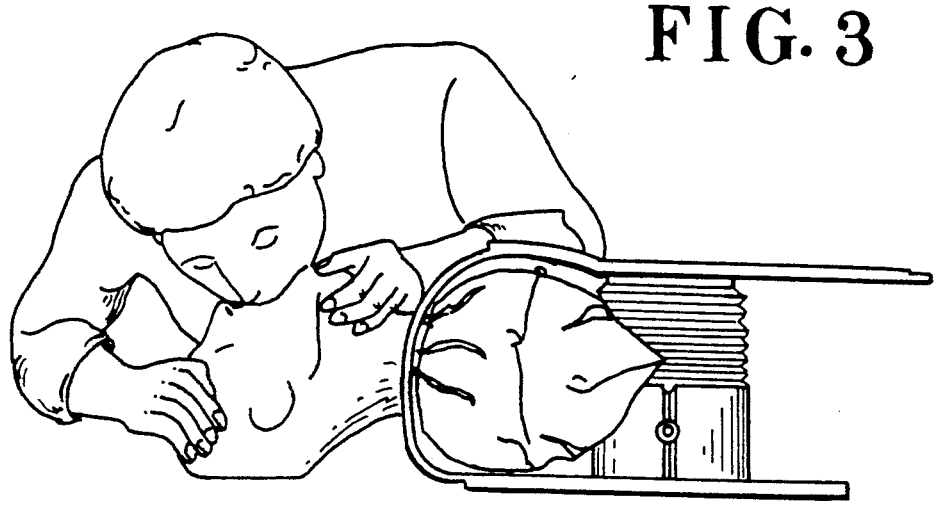
FIG. 3 is a side view of the manikin as it is being used for practise of ventilation techniques.

In operation the head (10) is tilted back so that seat (14) is flat on the floor then ventilation drills may be practised by pinching the nose and blowing air into the mouth (11) (see FIG. 3). The air enters the head (10) and expels air through throat (13) into bag (30) to fill the chest cavity and press the front plate (21) upward to visually indicate the lung expansion. When blowing stops air expels from bag (30) into the head (10) and through the mouth (11). The drill may then be repeated. External heart massage practise may be done by using the lower rib indicator (27) to locate the correct hand position (which is also the location of the plate (41) of the piston), then compression heart massage techniques may be practised using the piston (See FIG. 4).

After use a manikin may be disassembled for convenient storage or transport. The lung bags (30) may be thrown in the garbage. The inside of the head (10) may be washed out with an appropriate cleaning solution. The heads may be drip dried by inserting them in the inverted piston (40) as shown in FIG. 5 and standing them out to dry. The disassembled manikins may be stored as shown in FIG. 6 by laying the chest plate means (20) sheets adjacent one another and grouping the heads (10) and the piston (40) about them. This is a convenient arrangement for packing in a case for transport. It will be appreciated that other arrangements may be used for different storage containers.

INDUSTRIAL APPLICABILITY

The invention provides a piston suitable for use in a CPR practice manikin to facilitate the teaching of cardio-pulmonary techniques.

What is claimed is:

1. A piston for use in a cardio-pulmonary resuscitation manikin comprising a tube having a length from a top end to a bottom end approximating the depth of a chest cavity including;

an upper wall portion having corrugated folds made of a material sufficiently elastic to permit the corrugated folds to be folded completely and repeatedly and to exert a restorative force approximating the resistance of a human chest to compression so that the top end of the tube, under a sufficient force of compression, may be moved from a first position toward the bottom end of the tube to a second position and elastically flex back to restore the top end of the first position upon removal of the force of compression, a lower wall portion having walls sufficiently rigid to resist longitudinal displacement under a force of compression used in C.P.R. heart massage techniques, said lower wall having at least one opening to permit air to escape from and return to the interior of the tube during compression and restoration of the upper wall portion, the top end being closed and the bottom end being open, and four equidistantly spaced vertical reinforcing ribs in the lower wall and at least two ventilation ports located in said reinforcing ribs.

2. The piston of claim 1 in which there are integral fitting grooves adjacent to the top and bottom ends to attach the piston into a manikin.

3. A piston for use in a cardio-pulmonary resuscitation manikin comprising a tube having a length from a top end to a bottom end approximating the depth of a chest cavity in which:

the top end is closed to form a plate upon which compression can be exerted, the bottom end is open to permit access to the interior of the piston, integral fitting grooves are provided adjacent to the top and bottom ends to attach the piston into a manikin, the upper wall portion has corrugated folds made of a material sufficiently elastic to permit the corrugated folds to be folded completely and repeatedly and to exert a restorative force approximating the resistance of a human chest to compression so that the top end of the tube, under a force of compression, may be moved from a first position towards the bottom end of the tube to a second position and elastically flex back to restore the top end to the first position upon removal of the force of compression, and a lower wall portion has walls with equidistantly spaced vertical reinforcing ribs in the lower wall sufficiently rigid to resist longitudinal displacement under a force of compression used in C.P.R. heart massage techniques, said lower wall having at least one ventilation port located in said reinforcing ribs to permit air to escape from and return to the interior of the tube during compression and restoration of the upper wall portion.

4. An adult manikin piston of claim 3 in which the corrugated upper wall portion and the lower wall are approximately equal in length and in which the upper wall portion may be compressed approximately 2 inches.

5. The child manikin piston of claim 3 which the corrugated upper wall portion and the lower wall are approximately equal in length and in which the upper wall portion may be compressed approximately 1.5 inches.

* * * * *